United States Patent
Queveau et al.

(10) Patent No.: US 7,419,200 B2
(45) Date of Patent: Sep. 2, 2008

(54) RETRACTABLE PARCEL SHELF FOR A CONVERTIBLE VEHICLE WITH A FOLDING ROOF

(75) Inventors: Gerard Queveau, Le Pin (FR); Paul Queveau, Montravers (FR); Alain Sinegre, Ballainvilliers (FR)

(73) Assignee: Heuliez, Cerizay (FR)

( * ) Notice: Subject to any disclaimer, the term of this patent is extended or adjusted under 35 U.S.C. 154(b) by 99 days.

(21) Appl. No.: 10/553,620

(22) PCT Filed: Apr. 14, 2004

(86) PCT No.: PCT/FR2004/000917

§ 371 (c)(1),
(2), (4) Date: Jan. 17, 2006

(87) PCT Pub. No.: WO2004/091953

PCT Pub. Date: Oct. 28, 2004

(65) Prior Publication Data

US 2006/0113812 A1 Jun. 1, 2006

(30) Foreign Application Priority Data

Apr. 15, 2003 (FR) .................................. 03 04724

(51) Int. Cl.
*B60J 7/00* (2006.01)
*B60J 7/20* (2006.01)

(52) U.S. Cl. ............................... 296/24.44; 296/107.08
(58) Field of Classification Search ............. 296/24.44, 296/107.08, 136.04, 108, 37.16
See application file for complete search history.

(56) References Cited

U.S. PATENT DOCUMENTS

| 4,687,247 | A | * | 8/1987 | Muscat | 296/136.06 |
|---|---|---|---|---|---|
| 4,799,729 | A | * | 1/1989 | Muscat | 296/136.06 |
| 5,921,608 | A | | 7/1999 | Schmitt et al. | |
| 6,254,165 | B1 | | 7/2001 | Neubrand | |
| 6,454,343 | B1 | * | 9/2002 | Wagner et al. | 296/107.08 |
| 6,604,774 | B2 | * | 8/2003 | Koch et al. | 296/107.08 |
| 6,616,213 | B2 | * | 9/2003 | Koch | 296/107.08 |
| 7,032,947 | B2 | * | 4/2006 | Queveau et al. | 296/24.44 |
| 2002/0149227 | A1 | | 10/2002 | Wagner et al. | |
| 2003/0020298 | A1 | * | 1/2003 | Koch | 296/107.08 |
| 2007/0182200 | A1 | * | 8/2007 | Baumeier et al. | 296/107.08 |

* cited by examiner

*Primary Examiner*—Dennis H Pedder
(74) *Attorney, Agent, or Firm*—Bachman & LaPointe, P.C.

(57) ABSTRACT

The system comprises a stop fixed to the central panel and moving with the same towards the front or the rear of the vehicle. The stop is embodied such that when the central panel pivots to the rear to pass from the retracted position to the normal position with the roof in the stored position, said stop abuts a complementary formation on the roof in the stored position, in order to control the deployment of the lateral panels with relation to the central panel.

12 Claims, 5 Drawing Sheets

RETRACTABLE PARCEL SHELF FOR A CONVERTIBLE VEHICLE WITH A FOLDING ROOF

BACKGROUND OF THE INVENTION (1) Field of the Invention

The invention relates to a retractable parcel shelf system for a convertible vehicle with a folding roof.

(2) Prior Art

A retractable rear roof system is in itself known and comprises at least a panel and means for pivoting this panel about an axis transversal to the longitudinal axis (forward direction) of the vehicle. Thus, the panel moves from a normal operating position (typically a horizontal position) to a stored or retracted position inside a storage space in the vehicle which classically allows to also fold away the folding roof.

Traditionally, the storage space is composed of the rear boot of the vehicle which typically receives both the retractable panel and the folded roof.

When the parcel shelf system comprises a single-piece panel extending over the entire transversal length of the passenger compartment of the vehicle, the size of this panel could cause difficulties if the panel is to be put into the retracted position inside the storage space, within a area of limited transversal dimensions located between the wheels.

For this reason in particular, we already know of parcel shelf systems comprising a central panel placed on either side of the central panel and movable with respect to the latter. Means for displacement are furthermore envisaged to move the lateral panels with respect to the central panel, when the central panel is pivoted in either direction.

More precisely, the French application FR 02 05568 filed on 3 May 2002 under the applicant's name, discloses a retractable parcel shelf system comprising two lateral panels assembled so as to pivot about a substantially perpendicular axis to the upper surface of the central panel and embodied so that each lateral panel, in the pivoted position, is substantially stored under the central panel, which is itself in its retracted position. This system comprises means for controlling the inward pivot movement of each of the lateral panels with respect to the central panel whilst the central panel is pivoting from its normal position to its retracted position. Each of the lateral panels is controlled by the movement of the central panel via a set of connecting rods which bear upon corresponding surfaces of the body of the vehicle or upon load bearing points fixed to the central panel. In the normal position, substantially horizontal, of the central panel, the lateral panels are retained in their deployed position via springs, irrespective of the stored and folded or deployed and closed position of the roof.

In numerous cases, the rigid folding roof comprises on either side of the vehicle, irrespective of the type of folding roof, at least an arm whose lower end is pivot mounted onto the body of the vehicle about an transversal axis of said vehicle.

When the roof is folded so as to move from its closed position, over the passenger compartment of the vehicle, to its stored position in the boot of the vehicle, each pivoting arm moves from a substantially vertical position to a substantially horizontal position, which releases at each lateral end of the central panel an opening which is to be blanked off by the corresponding lateral panel. This is also the case for the corresponding back quarter light (or lateral element of the rear section of the roof) equipped with internal fittings. This back quarter light, of reasonable thickness and whose fittings can often hide the aforementioned pivoting arms, or which can act as a pivoting arm, frees, when stored away in the boot with the other parts of the roof, an opening which is to be blanked off.

SUMMARY OF THE INVENTION

The purpose of the invention is to propose a retractable parcel shelf system of simple design, inexpensive and reliable that controls the deploying of the lateral panels when the central panel moves from its retracted position to its normal position although the roof is in its stored and folded position inside the boot of the vehicle, and the and the retraction of the lateral panels when the central panel pivots in the opposite direction.

The invention thus relates to a retractable parcel shelf system for a convertible vehicle with a rigid roof that folds into a storage space in the vehicle, this vehicle has a longitudinal axis and a front section and comprises a chassis and a passenger compartment, the system comprises a central panel and two lateral panels located on either side of the central panel, fixed to the latter, and movable with respect to the latter, as well as means for pivoting the central panel about at least one axis transverse to said longitudinal axis, from a normal operating position to a forward retracted position on the inside of the storage space, thus allowing to store the folded roof in the storage space or inversely to extract this roof from its stored position into a closed position above the passenger compartment, and means for moving the lateral panels with respect to the central panel.

According to the invention, this system is characterised in that it comprises stop means fixed to the central panel and moving with the same or with respect to the same towards the front or the rear, these means being embodied such that when the central panel moves from its retracted position to its normal position, these stop means abut a complementary formation on the roof in its stored position in order to control the deployment of the lateral panels with respect to the central panel.

The lateral panels are therefore also solely deployed when the roof is in its stored position in the boot of the vehicle.

According to a beneficial alternative of the invention, the stop means are permanently manoeuvred towards the rear by elastic return means.

According to another beneficial alternative of the invention, the stop means are laid out at the free end of at least one arm assembled so as to pivot about a transversal axis of the body of the vehicle, and can be linked via a connecting rod to means for actuating the corresponding lateral panel.

According to an advantageous alternative of the invention, each lateral panel is assembled so as to pivot about a corresponding axis substantially perpendicular to the upper surface of the central panel. Each connecting rod is linked to the corresponding lateral panel via a spherical joint located with respect to said axis so that a relative forward displacement of each connecting rod with respect to the central panel pivots the corresponding lateral panel towards its deployed position.

Moreover, to obtain an efficient mechanical control of the parcel shelf system, it is also recommended that the movable stop is linked to a bar extending transversally with respect to the longitudinal axis of the vehicle and which it is attached to the chassis of the vehicle, and the central panel is assembled so as to pivot with respect to this bar, by means of at least a pair of articulated bars.

Preferably, the system comprises a stop linked to the aforementioned bar in order to control each lateral panel.

The system is thus made safe. Furthermore, the parcel shelf system thus constitutes a sub-unit which is attached to said bar and which can be assembled as such, onto a vehicle, this sub-unit being attached to the vehicle via the fixation means of said bar.

According to another feature of the invention, it is advantageously envisaged that in the retracted position, the central panel and the lateral panels are tilted in a substantially vertical position and, during this tilting, the connecting rod operates on the concerned articulated arm in order to put it into a substantially vertical position, so that the roof can pass by.

Thus, an appropriate space is created to allow the roof to pass by.

Also to be note is that advantageously, in the normal operating position of the central panel (typically horizontal or substantially horizontal), although the roof is closed above the passenger compartment of the vehicle, the concerned stop is manoeuvred towards the rear thanks to the return system and thus retains the lateral panels in a retracted position with respect to the central panel.

As previously indicated, the number of movements of the lateral panels is limited and the speed of the folding manoeuvres of the roof is optimised (because the lateral panels are already retracted).

The invention also relates to a convertible vehicle with a rigid folding roof comprising a parcel shelf system according to the first version of the invention.

BRIEF DESCRIPTION OF THE DRAWINGS

A more detailed description of the invention follows with reference to the annexed drawings given by way of example and non-restrictive and in which.

Figure 7:
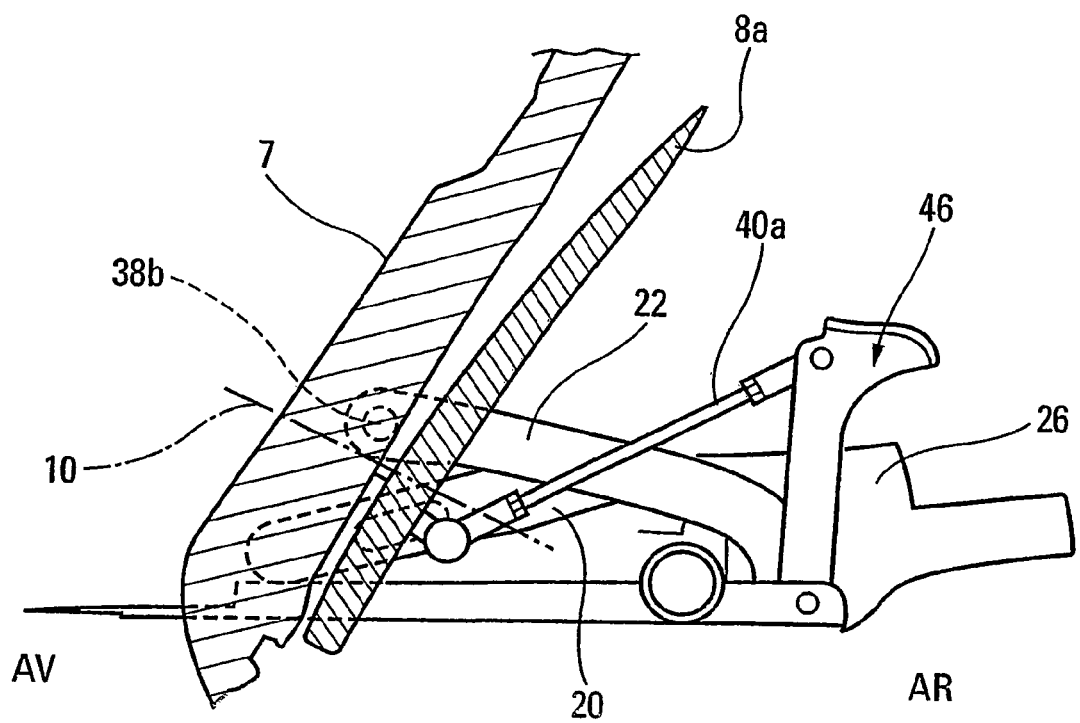
Figure 5:
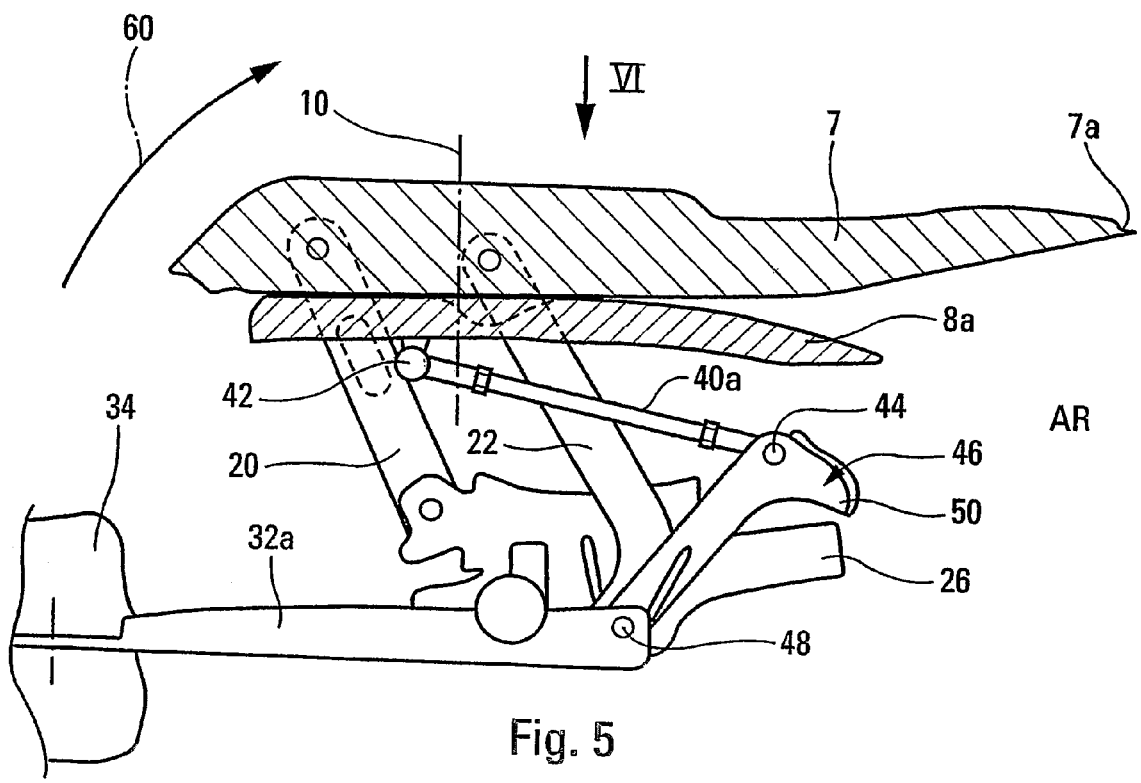
FIG. 5 is a localised side view (arrow V in FIG. 3) of the mechanism of the panels when the roof is closed above the passenger compartment, and that the panels are retracted.

FIGURE drawing 6 shows a localised zone of the central panel with, below, one of the lateral panels in the retracted position (seen in the direction of the arrow VI in FIG. 5);

FIG. 7 shows, as in FIG. 5, a side view of the mechanism of the panels when the panels tilt to allow the roof to pass by.

DETAILED DESCRIPTION OF THE PREFERRED EMBODIMENT(S)

Figure 1:
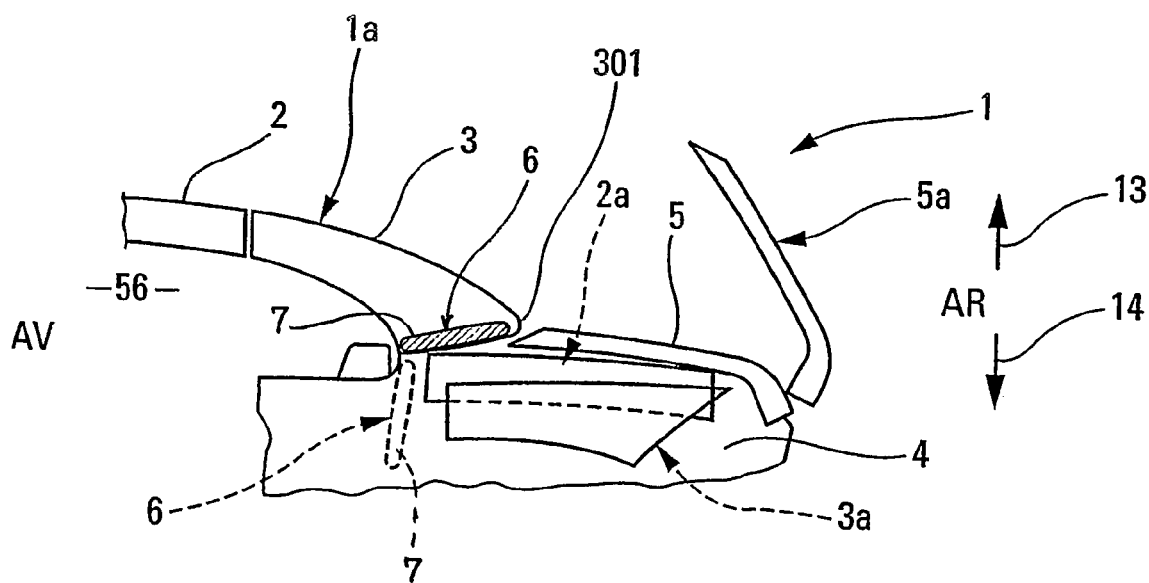
FIG. 1 is a partial diagrammatic top view of a convertible vehicle with a rigid folding roof capable of receiving a parcel shelf system according to the invention.

In FIG. 1, the embodiment shows a convertible vehicle 1 with a rigid folding roof 1a comprising a section of front roof 2 and a section of rear roof 3 which are movable with respect to the vehicle and one with respect to the other in order to be folded respectively into positions 2a and 3a inside the boot 4 whose lid 5 can open from the front to the rear into position 5a to allow the sections of the roof to pass by. More than two sections or less than two sections can be envisaged for the roof 1a. If, as is normally the case, the roof 1a has several sections, these sections are movable with respect to each other so as to articulate from a deployed position (substantially aligned above the passenger compartment) and a folded position, stored in the boot 4 in a stacked state in FIG. 1 (the rear section 3a having the front section 2a above it so that the two sections are placed substantially horizontally, one above the other).

Thus, when it is closed above the passenger compartment (on the left in FIG. 1), the roof 1a is stretched horizontally, whereas it is folded, in the boot, in its open state, stored in the boot (to the right in FIG. 1; dotted lines 2a and 3a).

The vehicle 1 comprises a parcel shelf system 6 which is represented in FIG. 1 by a continuous line, in its normal operating position, in this particular case substantially horizontal, and by dashes in its retracted position, in this example a substantially vertical position to the front of the boot.

Figure 2:
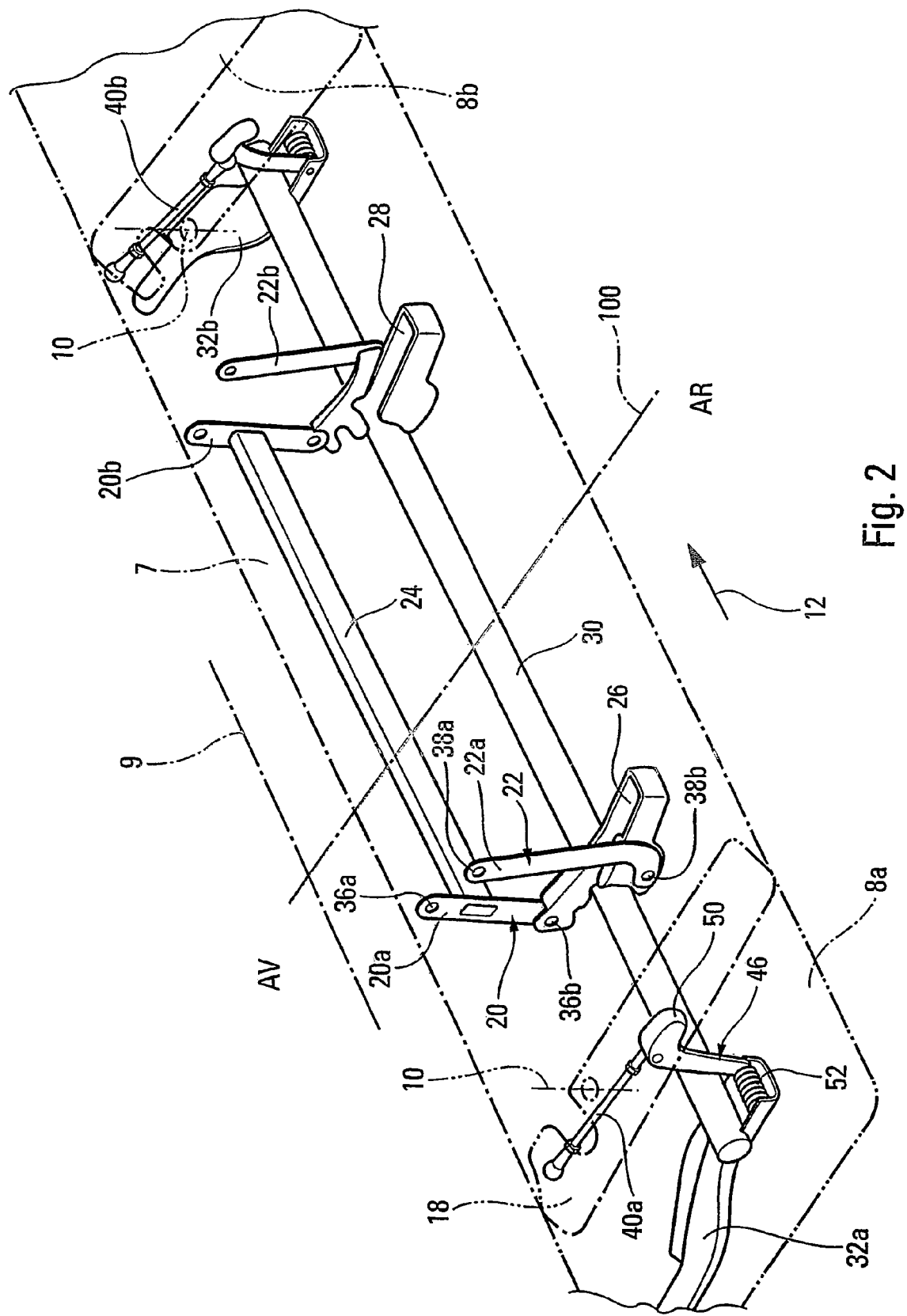
FIG. 2 diagrammatically shows the workings of the central panel and the lateral panels seen three quarters to the rear corresponding to an embodiment of the parcel shelf system according to the invention.

As can be diagrammatically seen in FIG. 2, the parcel shelf system comprises a central panel 7 and two lateral panels 8a, 8b located on either side of the central panel, in the transversal direction 9 of the vehicle which in this instance is perpendicular to the longitudinal direction 100 (of forward direction) of this vehicle.

Figure 6:
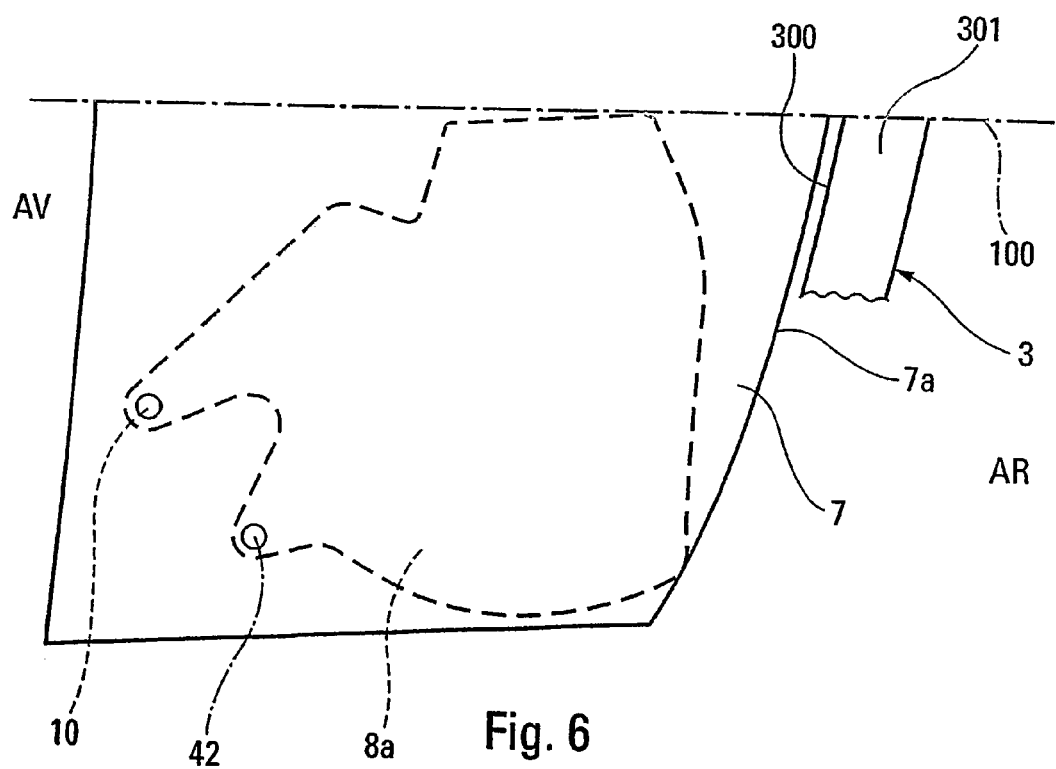

The lateral panels 8a, 8b are movable in relation to the central panel 7 so as to take either a deployed position (FIG. 2 or FIG. 3 for the panel 8a) or retracted position in relation to it (FIG. 6 or 7 of the same lateral panel).

The parcel shelf system 6 comprises means for pivoting the central panel 7 in the two directions about at least one transversal axis (parallel to the transversal direction 9), from its normal substantially horizontal position to a retracted position, stored inside the boot 4 and allowing to fold the two sections 2, 3 of the folding roof inside this boot.

The parcel shelf system 6 also comprises means for displacing the lateral panels 8a, 8b with respect to the central panel 7.

Even if other systems could be envisaged for such a displacement (vertical tilting system for the lateral panels about lateral axes parallel to the axis 100, or a runner system allowing to slide the lateral panels in relation to the central panel, parallel to the axis 9), it was envisaged in this instance that each of the lateral panels be assembled pivoting about an axis 10 (see FIG. 3 for panel 8a) substantially perpendicular to the upper surface 11 of the central panel 7. The axis 10 is fixed so that each of the lateral panels 8a, 8b, in the retracted position, is substantially pivoted under the central panel 7.

The system 6 further comprises means for controlling the pivoting of each of the lateral panels with respect to the central panel 7, in connection with the folding roof.

In some of the FIGURES, the markings AV and AR respectively define the front and rear sides of the concerned zones or of the vehicle itself (the front being pointed in the forward direction of the vehicle). The arrow 12 shows the direction towards the inside of the vehicle, in the direction of the longitudinal axis 100 through which the longitudinal plane of symmetry of the vehicle passes, whereas the arrows 13 and 14 respectively schematise (in particular in drawing 3) the respective direction upwards and downwards.

As can be seen in particular in drawings 2 and 3, each of the lateral panels has, in the vicinity of its front inner corner 16, an extension 18 extending transversally inwards (in the direction of the arrow 12), this being for the panel 8a in drawing 3 (under the central panel 7).

The extension 18 bears a pivot body capable of co-operating with a complementary coaxial pivot body fixed under the central panel. Any one of these pivot bodies can be a male body, the other being a circular female body capable of surrounding the male body.

As can be seen in different FIGURES, the central panel 7 is, by means of at least one pair of arms 20, 22, articulated through tilting parallel to the axis 9 between a normal operating position, typically a horizontal position, (see FIGS. 2 to 5) and a retracted position, typically a substantially vertical forward and downward tilted position (see FIG. 7), for example against the front facing wall delimiting the boot.

The central panel 7 preferably comprises two pairs of arms, respectively 20a, 20b; 22a, 22b in FIG. 2. The arms 20a, 20b are linked together via a rigid transversal rail parallel to the axis 9.

The arms 20a, 22a; 20b, 22b of each pair are pivot assembled on an articulated part, respectively 26, 28 (FIG. 2).

Each articulated part 26, 28 is solidly fixed to a transversal rod 30, parallel to the axis 9. The rod 30 is fixed to the vehicle, typically its chassis schematised by 34 in FIGS. 4 and 5, by means of plates 32a, 32b extending substantially parallel to the axis 100 and located in the vicinity of lateral ends of the rod 30 (see FIG. 2).

The arms of the two pairs 20, 22 are articulated, at their ends, along axes parallel to each other and to the transversal axis 9, respectively with respect to the panel 7 and in relation to the articulated parts 26, 28.

In order to ensure the tilting of the central panel, the rear arms 22a, 22b are longer than the front arms 20a, 20b and are arched so as to be longer horizontally compared to vertically. Furthermore, the four concerned zones of articulation (marked 36a, 36b for the arm 20a, and 38a, 38b for the second articulated arm 22a) are such that the rear point 38b is lower than the front point 36b.

Figure 4:
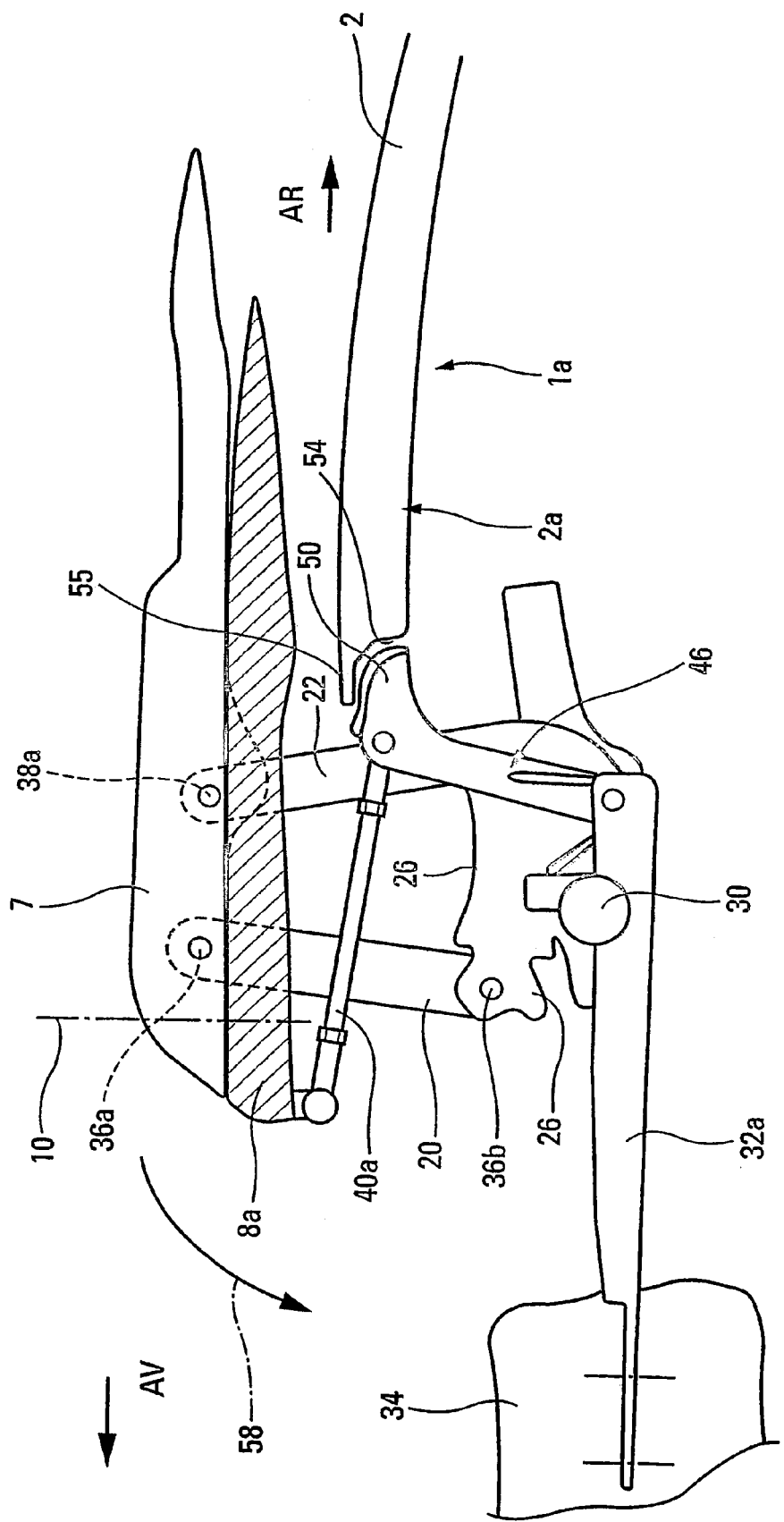
FIG. 4 shows a part of the mechanism of the panels, when the roof is stored in the boot (convertible position), along a cross section made in the vertical plane 4 in FIG. 3.

Thus, if for example we compare FIGS. 4 and 7, we note that the panel 7 (and with it the lateral panels, including the panel 8a) tilt via deformation of the malleable parallelograms constituted by the panel 7, the concerned fixed articulated part, such as 26, and the set of arms 20, 22.

The obtained retraction of the panel 7 is typically controlled by an independent control system (not represented), such as a motor with a final drive shaft engaged with the panel.

The lateral panels 8a, 8b are each articulated towards the lateral ends of the panel 7, by means of a connecting rod, 40a for the panel 8a, 40b for the panel 8b.

The retraction of the lateral panels in relation to the central panel being, in the considered example, performed via rotation about the axis 10 by means of the aforementioned connecting rods and therefore being identical for the two panels, we will only describe the related mechanism for the panel 8a.

Thus, a front end of the connecting rod 40a is linked, in the vicinity of the zone 18, to the panel 8a via a spherical joint 42. At the opposite end, the connecting rod 40a is articulated in rotation, about 44, with respect to an articulated stop 46, itself pivot assembled about 48 with respect to the plate 32a.

The axes of articulation of the zones 44, 48 are parallel to the transversal axis 9 and respectively located towards the opposite ends of the stop 46 which has an elongated shape, in the form of an arm, with towards the end of the zone 44, a nozzle 50 pointing towards the rear.

A return spring 52 (FIG. 2) naturally displaces the stop 46 towards the rear, and via the connecting rod 40a, 40b also displaces the corresponding lateral panel 8a, 8b in order to retain it in its retracted position in relation to the central panel, that being in the considered example rotated about the axis 10 so as to be dissimulated under the central panel 7 (position of FIGS. 5, 6 and 7).

Figure 3:
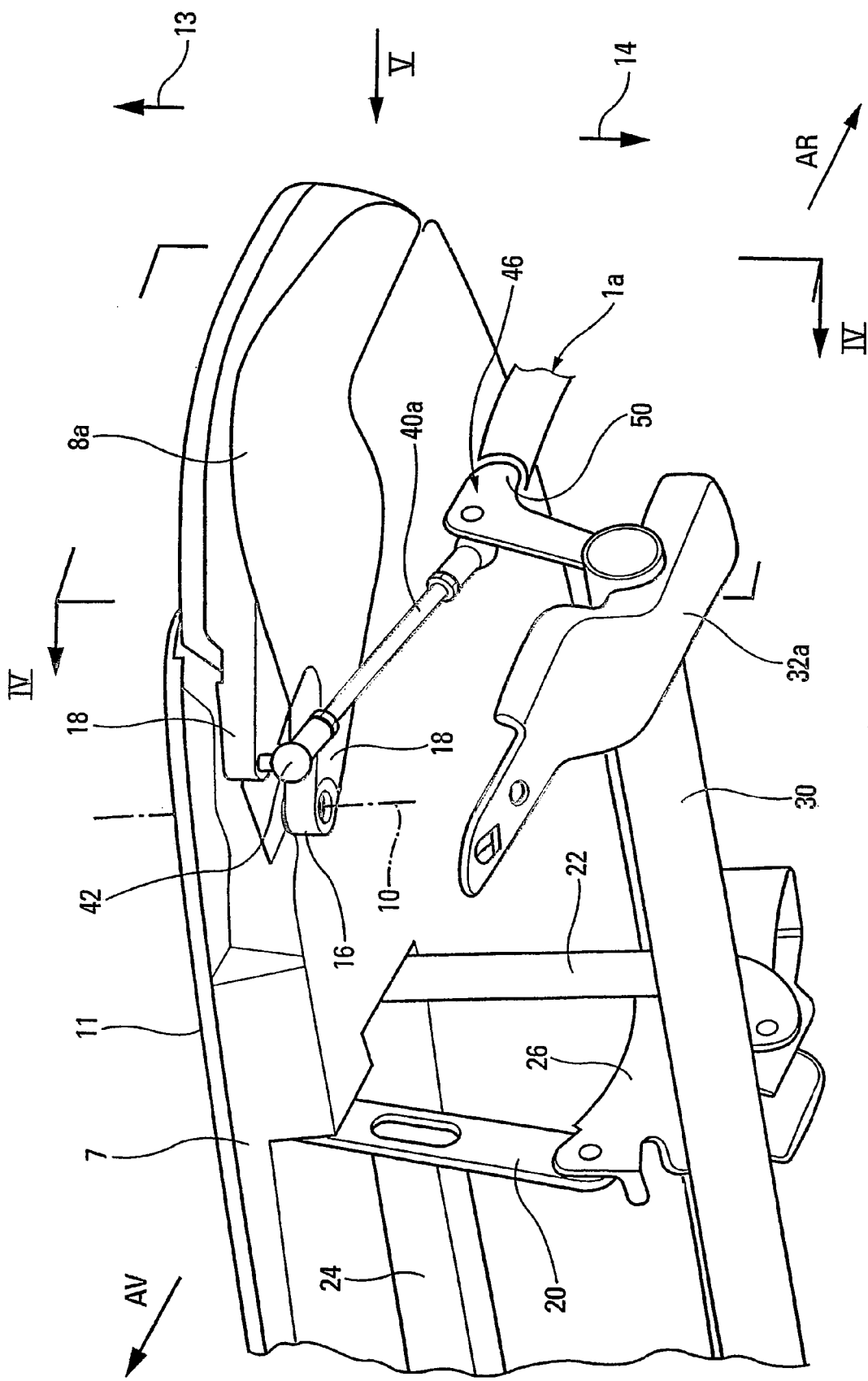
FIG. 3 shows an enlarged localised view, seen three quarters to the underneath staring from the front, of the driving mechanism of one of the lateral panels of the system in FIG. 2.

Given the above, we understand that in FIGS. 2, 3 and 4, the deployment of the lateral panels with respect to the central panel 7 was controlled by the nozzle 50 of the stop 46 (or more precisely of each stop, as we recommend using a system thus designed for each lateral panel, as shown in FIG. 2) which abutted and was stopped by a complementary body against the effect of the return system.

According to the invention, this displacing of the movable stops 46 which controls the deployment of the lateral panels is obtained via contact with a zone of the roof 1a, advantageously the front end (or front zone) 2a located to the front of the roof (see FIG. 4).

This contact zone can be at the front of the front roof 2, if the folding of the roof (in this particular case its sections 2, 3) leads to this situation.

In FIG. 4, the protrusion 50 of the stop 46 penetrates into a retained 54 substantially in the shape of a quarter circle equipped with an upper lip 55 and located at the front end of the stored roof (in this instance the front section 2), for example designed to cover the transversal seal envisaged along the front edge (not represented) of the opening of the roof.

In this position, the roof is open, that being folded into the boot 4, whereas the central panel 7 is in the normal operating position (in this instance the horizontal position), the manoeuvring of the stops 46 against the return system ensuring the lateral deployment of the panels 8a, 8b.

In the illustrations, we also note that when the vehicle is no longer in this convertible configuration (roof stored in the boot), each stop 46 is naturally manoeuvred backwards by the return spring 52, so that the lateral panels are retracted (FIGS. 5, 6 and 7), which in particular frees a space allowing to displace the central panel from its normal operating position to its retracted position (tilted position in FIG. 7), facilitating the manoeuvring of the roof from its open roof position (convertible) to its closed roo position above the passenger compartment 56 (FIG. 1).

To change from the open roof position of FIG. 4 to that of the closed roof as in FIG. 5 (where the lateral panels are therefore retracted), we execute the intermediary stage in FIG. 7 which shows the central panel in its tilted position, remembering that the movement of the panel into this position implies the movement of the lateral panels into the same tilted position in relation to the horizontal, given the linkages that exist between them.

Starting from the open and folded roof position in FIG. 4, a means for controlling (not represented) drives the panel 7 forwards, which therefore makes it tilt via articulation about the arms 20, 22, in the direction of the arrow 58.

Right from the start of the pivoting of the central panel 7, the stop arms 46 manoeuvred backwards by the spring 52 remain stationary in relation to the chassis of the vehicle, the nozzle 50 pushes against the folded roof.

Each of the connecting rods 40a, 40b, immobilised by the corresponding stop arms 46, retains the corresponding spherical joint 42, which pivots the lateral panel 8a, 8b towards its retracted position with respect to the central panel when the latter pivots.

When each lateral panel 8a, 8b attains its retracted position, the spherical joint 42 pulls the connecting rod 40a, 40b, and therefore the corresponding stop arm 46 forwards against the effect of the return spring 52 as far as the end of the forward pivoting movement of the central panel 7 when the latter has attained its tilted position (FIG. 7).

Advantageously, to facilitate the movement of the roof, the stop arms 46 extend substantially vertically into the stored/tilted position of the panel 7, despite the forward pressure applied by the return spring 52 (see FIG. 7).

The panels being in their retracted position in FIG. 7, the movement of the roof above them and the unfolding of this roof as far as its closed position above the passenger compartment allow the central panel to return to its normal operating position as in FIG. 5.

The concerned control means (hydraulic, electric, etc.) thus in return ensure the tilting, via the arms 20, 22 of the panel 7 in the direction of the arrow 60 in FIG. 5, until the panels return to their horizontal position. In this embodiment, the lateral panels remain retracted, folded under the central panel when the roof does not apply any pressure on the stops.

In comparing FIGS. 4 and 5 we also note that the central panel 7 is, in the normal operating position, further forward in the direction of the vehicle in the closed position of the roof (FIG. 5) than it is in the stored and folded position of this roof (FIG. 4).

As schematised in FIGS. 5 and 6, in the closed position of the roof, the lateral panels 8a, 8b are in their retracted position under the central panel 7 as the nozzle 50 of the stop 46 did not meet with any obstacle during the pivoting of the central panel 7 from its retracted position towards its normal operating position corresponding to the closed position of the roof.

This further forward position towards the front of the central panel 7 is made necessary because, as schematised in FIG. 6, the rear edge 7a of the central panel 7 must stop substantially before the front surface 300 of the rear lower edge 301 of the rear section of roof 3 in the deployed position of the roof 2, 3 above the passenger compartment 56 (see FIG. 1).

In the stored and folded position of the roof in the boot of the vehicle, the central panel 7 can be in its rear position in FIG. 4 obstructing the opening freed by the rear lower edge 301 also stored in the boot.

We also note that an alternative to return systems other than the torsion spring 52 can be used to manoeuvre and retain each stop 46 towards the rear, when there is no contact with the concerned zone of the roof. We can thus envisage a hydraulic jack or an arm coupled to an electric motor actuating the concerned stop.

The above is a description of lateral panels 8a, 8b, pivoting with respect to the central panel 7. We can also envisage lateral panels assembled so as to slide in a transversal direction of the vehicle. All that is required is to provide any known device allowing to transform a longitudinal relative displacement of the connecting rod 40a, 40b into a transversal relative displacement of the corresponding lateral panel 8a, 8b.

The invention claimed is:

1. A retractable parcel shelf system for a convertible vehicle comprising a rigid roof that folds in a storage space of the vehicle, which vehicle has a longitudinal axis, a front and a rear, a chassis and a passenger compartment, the system comprising:
   a central panel and two lateral panels located on either side of the central panel, both said lateral panels being fixed to the central panel and being movable with respect thereto between a retracted position and a deployed position;
   means for pivoting the central panel about at least one axis transverse to said longitudinal axis from an operating position to a forward retracted position in the storage space, thus allowing to store the roof in a folded condition in the storage space or inversely to extract said roof from a stored position in the storage space into a closed position above the passenger compartment;
   means for moving the lateral panels with respect to the central panel; and
   stop means fixed to the central panel and moving with the central panel or with respect to the central panel towards one of the front and the rear of the vehicle, said stop means being embodied such that when the central panel pivots to the rear to move from the retracted position to the operating position whereas the roof is in the stored position, the stop means abut a complementary formation on the roof in the stored position, in order to control the deployment of the lateral panels in relation to the central panel.

2. The parcel shelf system according to claim 1, wherein the stop means are permanently urged towards the rear by elastic return means.

3. The parcel shelf system according to claim 1, wherein the stop means are laid out at a free end of at least one arm assembled so as to pivot about an axis transverse to the longitudinal axis of the vehicle.

4. The parcel shelf system according to claim 1, wherein the stop means are linked via connecting rods to said means for moving the lateral panels.

5. The parcel shelf system according to claim 4, wherein each lateral panel is assembled so as to pivot about a pivot axis substantially perpendicular to an upper surface of the central panel between said retracted position which under the central panel and said deployed position, and each connecting rod is linked to the corresponding lateral panel through a spherical joint located in relation to said pivot axis so that a relative forward displacement of each connecting rod with respect to the central panel induces the corresponding lateral panel to pivot towards said deployed position.

6. The parcel shelf system claim 5, wherein:
   in the retracted position of the central panel, said central panel and the lateral panels are tilted in a substantially vertical position; and
   during said tilting, the connecting rods operate on the stop means in order to put said stop means into a substantially vertical position, so that the roof can pass by.

7. The parcel shelf system according to claim 2, wherein, in the operating position, whereas the roof is closed above the passenger compartment of the vehicle, the stop means are manoeuvred towards the rear thanks to said elastic return means and thus retain the lateral panels, in said retracted position, with respect to the central panel.

8. The parcel shelf system according to claim 1, wherein the central panel is, in the operating position, further forward in the direction of the front of the vehicle in the closed position of the roof than it is in the stored position of said roof.

9. A convertible vehicle comprising:
   a longitudinal axis;
   a front and a rear, and a storage space;
   a rigid roof that folds at the location of said storage space;
   a chassis, a passenger compartment and a retractable parcel shelf system;
   said retractable parcel shelf system comprising a central panel and two lateral panels located on either side of the central panel, both said lateral panels being fixed to the central panel and movable with respect thereto;
   means for pivoting the central panel about at least one axis transverse to said longitudinal axis from an operating position to a forward retracted position in the storage space, thus allowing to store the folded roof in the storage space or inversely to extract said roof from a stored position into a closed position above the passenger compartment;
   means for moving the lateral panels with respect to the central panel;
   stop means fixed to the central panel and moving with the central panel or with respect to the central panel towards one of the front and the rear of the vehicle, said stop means being embodied such that when the central panel pivots to the rear to move from the retracted position to the operating position, whereas the roof is in the stored position, the stop means abut a complementary formation on the roof in the stored position in order to control the deployment of the lateral panels with respect to the central panel;

each movable stop means being linked to a first bar extending transversally to the longitudinal axis of the vehicle and attached to the chassis of the vehicle; and the central panel being assembled so as to pivot with respect to said first bar, by means of at least a pair of articulated second bars.

10. The vehicle according to claim 9, wherein the movable stop means are laid out at a free end of at least one arm assembled so as to pivot about an axis transverse to the longitudinal axis of the vehicle.

11. The vehicle according to claim 9, wherein:

the stop means are permanently urged towards the rear by elastic return means; and in the operating position, whereas the roof is closed above the passenger compartment of the vehicle, the stop means are manoeuvred towards the rear thanks to said elastic return means and thus retain the lateral panels in a retracted position with respect to the central panel.

12. The vehicle according to claim 9, wherein the central panel is, in the operating position, further forward in the direction of the front of the vehicle in the closed position of the roof than it is in the stored position of said roof.

* * * * *